Patented Mar. 4, 1941

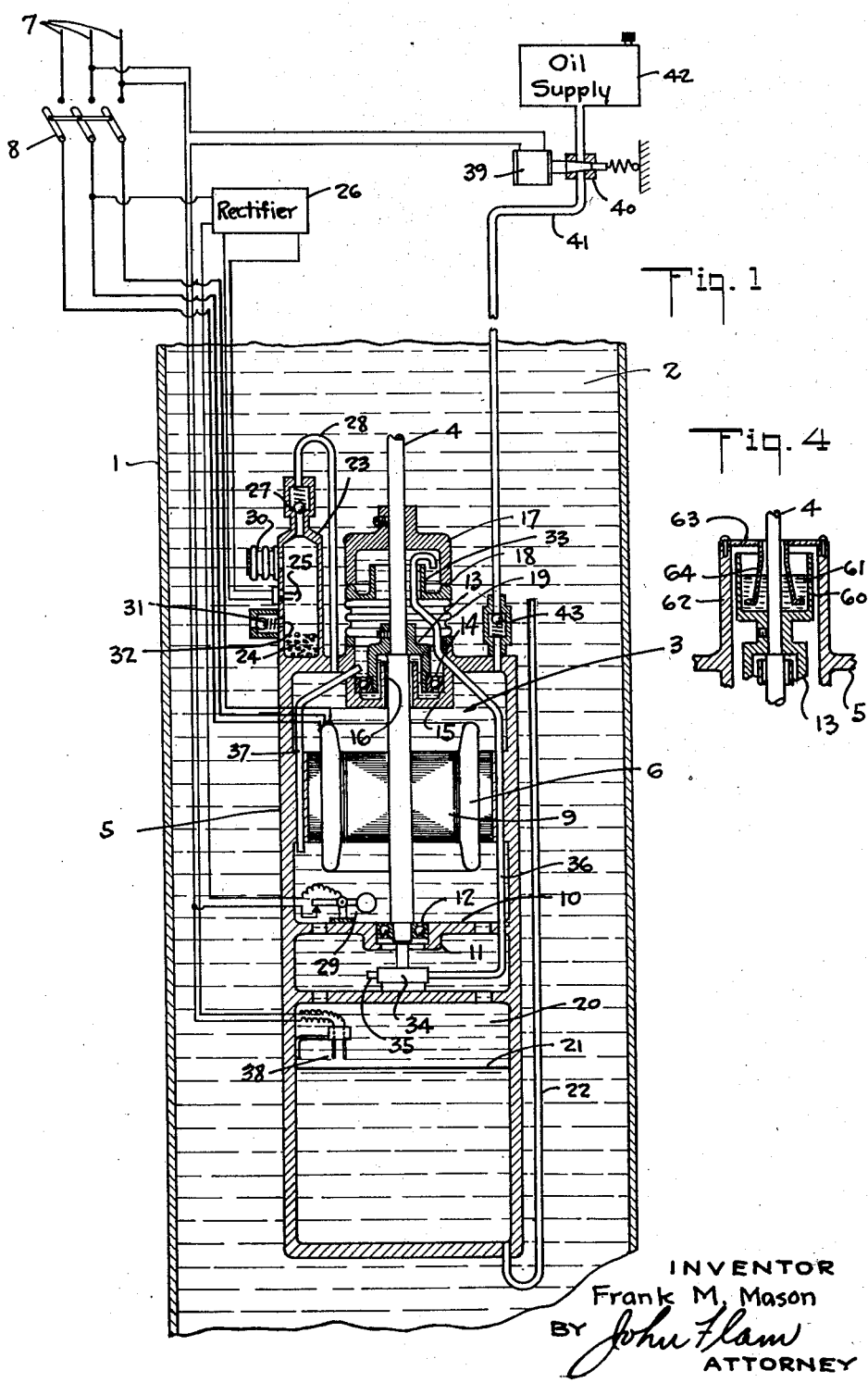

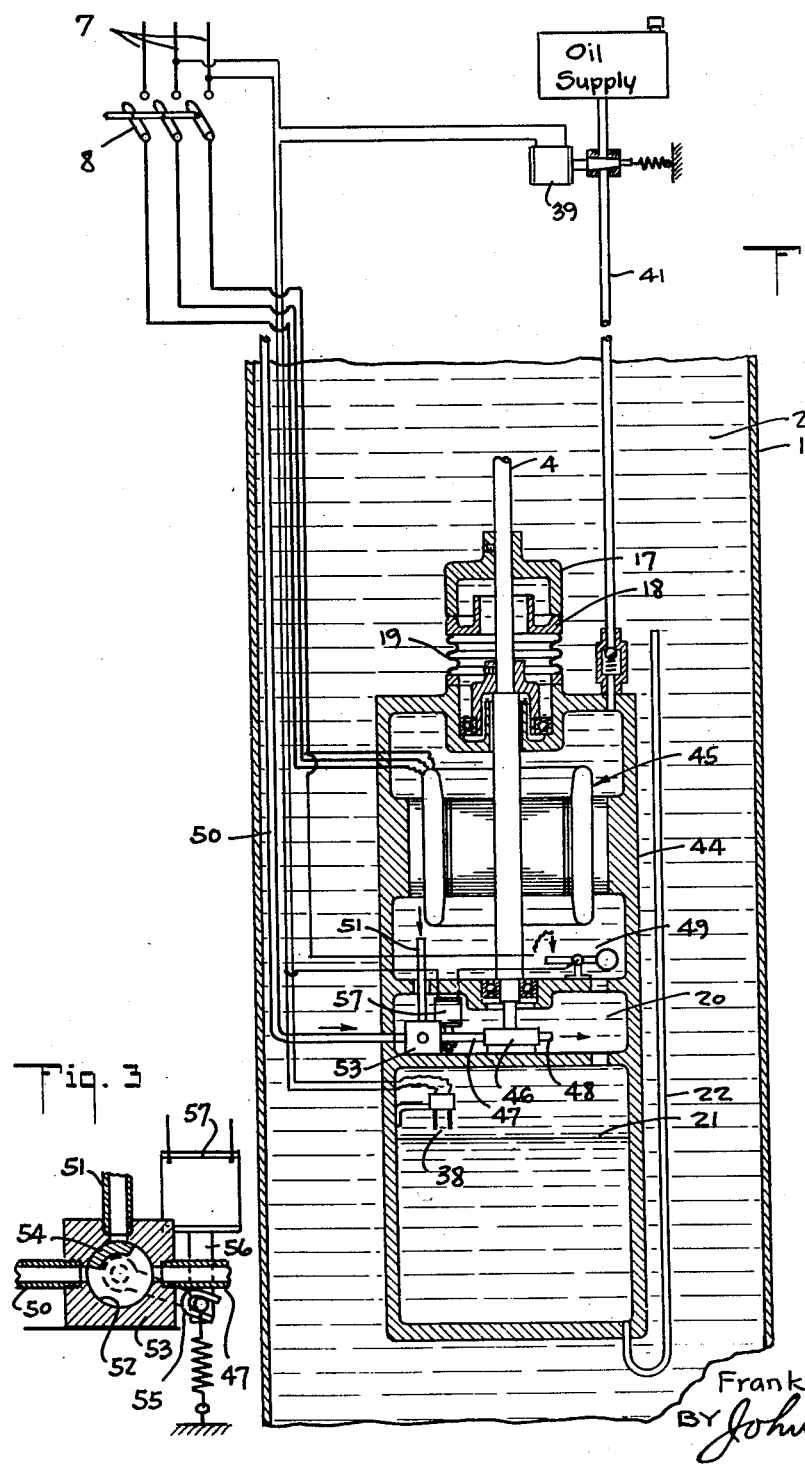

2,233,672

UNITED STATES PATENT OFFICE 2,233,672

SUBMERSIBLE ELECTRICAL MOTOR

Frank M. Mason, Chicago, Ill., assignor to U. S. Electrical Motors, Inc., Los Angeles, Calif., a corporation of California Application December 6, 1937, Serial No. 178,198

24 Claims. (Cl. 172—36)

This invention relates to an electrical motor adapted to be submerged in a well for operating a pump acting on the well liquid. Ordinarily such motors are of the squirrel cage induction motor type.

Motors of this character must be protected against the entry of well liquid, which is usually water carrying foreign matter. The windings and bearings, obviously, must be protected from such liquid if the motor is to operate at all.

It has been proposed to provide a liquid tight casing for the motor, with a seal for the casing where the motor shaft projects from the casing. It has also been proposed to fill the whole casing with a neutral liquid, such as oil, that serves also as a lubricant for the shaft bearings. A filling of this character renders it easier to exclude the well liquid.

Nevertheless, the filling introduces a disadvantage which will now be discussed. The liquid extends around the rotor and between it and the stator. Accordingly during operation of the motor, particularly at high speeds, there is a considerable skin friction loss. Also, considerable turbulence may be initiated. These factors materially reduce the motor efficiency. The high speed operation is especially desirable to retain because the motor may then be directly connected to a high speed pump, that is less expensive and has higher efficiency than a low speed pump.

Motors in installations of this sort are not required to work continuously. Often there are extended periods of inaction. Accordingly it is possible so to arrange matters that during periods when the motor is energized, the liquid level in the casing is lowered, and the rotating parts operate substantially entirely in a gaseous atmosphere, such as air or the like. Furthermore, the rise and fall of the liquid level may be made automatic, in response to deenergization and energization of the motor.

It is one of the objects of this invention to provide a simple and effective system of this general character, which operates to free the rotating parts of unnecessary skin friction during activity of the motor.

It is another object of this invention to provide a gas pressure system that is self-contained and obviates the necessity of creating fluid pressures at the top of the well.

For example, one way of creating the gaseous atmosphere is by electrolysis, occurring in an auxiliary chamber. It is accordingly another object of this invention to provide a gas under sufficient pressure, by electrolysis, to displace the liquid around the rotating parts.

The creation of sufficient gas pressure to accomplish these results may be obtained in another way; as for example by an appropriate compressor pump directly operated by the motor. It is accordingly still another object of this invention to make it possible to provide a compressor operated by the motor for creating the desired gas pressure to depress the liquid level in the casing.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly diagrammatic, of an apparatus incorporating the invention, shown as disposed within a well, the submersible structure being mainly in section;

Fig. 2 is a view similar to Fig. 1, but of a modified form of the invention;

Fig. 3 is an enlarged fragmentary diagram of one of the valves utilized in connection with the form of the invention illustrated in Fig. 2; and Fig. 4 is a fragmentary sectional view, showing an alternative form of seal for the motor shaft.

In the present instance, the well is shown as defined by a well casing 1, within which is disposed the well liquid 2. This well liquid is usually water or the like.

In order to provide power for a pump disposed within the well liquid 2, use is made of an electric motor 3 operating to rotate an upwardly extending shaft 4. This shaft 4 is intended to be directly connected to a pump, not shown.

The motor 3 is disposed within and supported by a housing structure, including the casing 5. The stator, including the windings 6, is intended to be connected, as by the aid of water proof cables entering in a fluid tight manner into the casing 5, to an appropriate source of electrical energy at the top of the well. This source may be represented, for example, by the mains 7. A switch 8 is indicated diagrammatically for controlling the energization of the motor 3.

The rotor 9 is shown as directly mounted on the shaft 4. The shaft may be rotatably supported in a manner now to be described.

At the lower end of the shaft 4 there is located a transverse apertured wall 10 within the casing 5. A central boss 11, shown integral with the wall 10, serves to support the outer race of a ball bearing structure 12. The inner race of this ball bearing structure is supported upon shaft 4.

Adjacent the upper end of the shaft there is supported thereon a tubular collar 13, supporting the inner race of a ball bearing structure 14. The outer race of this ball bearing structure is supported within a downwardly directed hollow boss 15. This hollow boss 15 is also provided with an inner annular wall 16 to provide an annular well for the lubricant around the ball bearing structure 14.

The casing 5 is so arranged that it may be completely filled with a neutral liquid, such as oil. Such a filling is useful in insuring against material leakage of the well liquid 2 inside of the casing 5. However, during periods of energization of the motor 3 it is desirable that the level of this neutral liquid be depressed at least below the stator and its windings, whereby skin friction losses due to rotation in a liquid of material viscosity, may be obviated. The manner in which this result is effected will be shortly described.

It is apparent that the casing 5 must be sealed normally against the entry of well liquid into that part of the casing in which the rotating elements are located. For this purpose a mechanical seal is arranged adjacent the top of the shaft 4. In this instance this seal comprises an inverted rotary cup 17 carried by the shaft 4. The edge of this cup is in contact with a non-rotary sealing member 18. This non-rotary sealing member 18 is shown as supported in liquid tight manner on the casing 5, as by the aid of the metal bellows 19. Appropriate means may be provided if desired, to urge the relatively movable surfaces of members 17 and 18 toward each other so as to effect an appropriate seal.

During periods when the motor 3 is not energized, the upper portion of the casing 5 may be filled with the neutral liquid 20. This neutral liquid may extend downwardly so as to contact along the surface 21, with the well liquid that enters the bottom extension of the casing 5. Under such circumstances the oil 20 extends upwardly so as to overlie the areas of contact between the sealing members 17 and 18, providing a supplemental liquid seal at this place.

In order to facilitate lowering of the submersible structure within the well without danger of material loss of the oil 20 that is enclosed within the casing 5, use is made of a balance tube 22. This balance tube 22 is open at its upper end and communicates with the bottom of the casing 5. It is apparent that the casing 5 can be filled at least to the level of the top of pipe 22 which extends substantially to the top of the casing, before the submersible structure is lowered. Upon lowering the structure within the well, the well liquid 2 may be forced by the gravity head downwardly into the tube 22.

For the position of the switch 8 shown in Fig. 1, the motor 3 is deenergized, and the oil filling 20 is permitted to fill the casing above the level 21. However, when the switch 8 is closed, provisions are made for creating a sufficient gas pressure within the casing 5 to depress the oil level below the stator windings 6.

In the present instance, in the form shown in Fig. 1, the gas generation is accomplished by electrolysis. This electrolysis can be effected within a supplemental chamber 23, shown as supported on top of the casing 5. This chamber is intended to be filled with an electrolyte, and for this purpose there may be disposed within the chamber a quantity of appropriate salts 24 to form an electrolyte capable of ready decomposition by electrolytic action. To secure the electrolytic action, use is made of a pair of spaced electrodes 25 extending into the liquid in the chamber 23. These electrodes may be supplied with a potential difference by being connected to the output side of a rectifier 26 located at the top of the well. The input side is connected, as will be described hereinafter, in such a way that the rectifier is not energized unless the motor 3 is energized. Accordingly, electrolysis can occur only during periods of energization of the motor 3.

As is well understood, the decomposition of the electrolyte in the chamber 23, due to the passage of the electric current, causes an evolution of gas. By appropriate choice of the chemicals 24, this evolution of gas may be caused to be quite intensive and very rapid. Accordingly, the gas thus generated may be caused to pass a check valve 27 located in the top of the chamber 23 and into the conduit 28 leading downwardly into casing 5. The check valve 27 insures against reverse flow of any liquid or gas from the casing 5 to chamber 23.

The gas pressure thus evolved is made effective within the casing 5 to lower the liquid level therein. This lowering continues until the level reaches somewhat below the windings 6. When this occurs a float switch mechanism 29 operates to open the input circuit of the rectifier 26. This input circuit also includes the switch 8. Accordingly, two conditions must be present for the electrolysis to be accomplished: one is the closing of switch 8, and the other is the closing of float switch 29 by rise of the neutral liquid level beyond this float switch.

The result of this arrangement is that during operation of the motor 3, the liquid level is maintained at about the level of the float switch 29. If the level should rise during such motor energization, the float switch 29 closes, rectifier 26 is energized, and electrolysis is immediately effective to depress the level. On the other hand, when switch 8 is opened to deenergize the motor 3, the electrolysis also stops and the gas in the top of the casing 5 gradually leaks away. The oil level gradually rises to the top.

Certain features of the operation of the electrolysis mechanism may now be touched upon. When gas is first evolved in the chamber 23 by electrolytic action, a rather sudden increase in pressure may be expected. Unless precautions be taken, then some of the electrolyte in container 23 may bubble over past the check valve 27 and pass into the casing 5.

In order to obviate such occurrences, provisions are made to increase the volume of chamber 23 during the first period of violent gas ebullition. Thus a metal bellows 30 is provided communicating with the interior of the chamber 23 and capable of expanding up to a definite limit upon the occurrence of unduly large gas pressures in the chamber 23.

Furthermore, another check valve 31 is provided to control the inlet passage 32 to the container 23. This check valve mechanism 31 is arranged to be spring biased. Under normal conditions the pressure inside of chamber 23 is at least as great as the pressure in the well, and accordingly the valve 31 stays closed. However, should there be a reduction in pressure, as for example upon there being insufficient liquid electrolyte for supporting the process of electrolysis, the valve 31 opens and permits the passage of liquid into the receptacle 23.

It is apparent that during energization of motor 3 the oil would recede below the level of contact between the sealing members 17 and 18. In order to insure that there be a supply of oil overlapping the area of contact, provisions are made for lifting some oil into the annular space formed between the annular wall 33 on the nonrotary member 18 and the contacting flanges of the members 17 and 18. For this purpose, the shaft 4 directly drives a small pump mechanism 34 located below the bearing structure 12. This pump is submerged in oil at all times and has an inlet 35 opening into the oil. Its outlet connects to a conduit 36 which passes upwardly and over into the annular space adjacent the contacting sealing members. The oil is intended to overflow the upper edge of the annular wall 33 and to flow into the oil well in which the upper ball bearing structure 14 is located. A drain pipe 37 leads from above this well down through the stator laminations to discharge the oil in the bottom part of the casing. In this way oil is prevented from being received in the rather narrow air gap between the rotor 9 and stator 6.

As the body of the neutral liquid is depressed within the casing 5, it is apparent that the well liquid in the bottom of the casing is urged downwardly. This corresponds to a lowering of the level 21 of the well liquid. Upon discontinuance of the electrolytic action the gas collected in the top of the casing 5 gradually dissipates and the body of oil moves upwardly. Should there be any material leakage of well liquid within the casing 5, the level 21 may rise to a dangerously high point. In order to prevent such occurrences, a water level detector 38 is provided. This detector comprises a pair of spaced electrodes which are, of course, out of electrical connection so long as they remain within the body of neutral liquid. Should the level 21 rise, however, the water will complete an electric circuit and there will be some current flow between the electrodes of the detector 38. The detector circuit is shown in this instance as being formed by a circuit connected to two of the three supply mains 7. Also in series in this circuit with the detector 38 is a solenoid 39. This solenoid operates when energized to open a valve 40 in a supply conduit 41. It is apparent that in order for solenoid 39 to be energized, the water level 21 must rise sufficiently to effect a connectiton between the electrodes of the detector 38.

The supply conduit 41 is shown as connected to a source of oil supply 42 located at the top of the well. It leads downwardly past a check valve 43 into the casing 5. The check valve prevents reverse flow of the oil upwardly through the conduit 41.

The detector system just disclosed thus insures that the water level 21 will be lowered by supply of oil under sufficient gravity head whenever this water level rises too closely to the rotating parts of the apparatus.

In the form of the invention just described, the creation of sufficient gas pressure to depress the level of the inert liquid in the casing 5 is obtained by the aid of electrolysis. In the form of the invention illustrated in Fig. 2 the electrolysis is dispensed with. In this case the casing 44 immersed in the well liquid 2 is provided, as before, with substantially the same type of motor 45 as heretofore described. This motor 45 is energized as before by closing of the switch 8 connected to the mains 7. The balance tube 22 is used as before to permit a casing full of oil to be lowered into the well. Furthermore, the detector 38 operates as before to actuate the solenoid 39 for supplying oil through conduit 41 whenever the water level 21 approaches an undesired point.

As before, the sealing members 17 and 18 may operate to insure against any material entry of well liquid into the casing 44. Provision should of course be made to maintain the space within the members 17, 18, filled with oil, as in the first form.

While the switch 8 is disconnected there is no action taking place tending to lower the level of the inert liquid 20 within the casing 44. However, when the switch 8 is closed to energize the motor 45, this motor operates a compressor 46 directly connected to the bottom of the shaft 4. This compressor has an intake conduit 47 and an outlet 48 passing the compressed air into the interior of the casing 44. The arrangement is such that while the level of the inert liquid is sufficiently high to keep the float switch 49 open, the supply of gas or air is provided from the exterior of the casing 44, as for example by the aid of an upwardly directed conduit 50 which extends into the atmosphere at the top of the well. However, when the switch 49 closes in response to the lowering of the inert liquid to the desired value, the supply conduit 50 is closed and instead a supply conduit 51 is opened. This conduit 51 opens also within the casing 44 and the result is that there is a recirculation of the air or gas that has already been passed into the casing 44. In other words, the compressor 46 is unloaded, both its inlet and outlet being connected to the same space that is in the interior of casing 44.

The control of the intake by the aid of the switch 49 is best understood by reference to Fig. 3. In this figure it is seen that the conduits 50 and 51 lead to a common bore 52 provided in a valve block 53. The inlet 47 to the compressor 46 also leads into this bore 52. A rotary gate 54 is provided, having two positions. In the position shown in Fig. 3, conduit 51 is closed but the passage from conduit 50 to 47 is clear. Upon rotation of the gate 54 in a counterclockwise direction, it is apparent that the conduit 50 will be closed and conduit 51 will be opened to be placed in communication with the inlet 47. This rotation of the gate 54 is provided by the aid of a crank arm 55 operated by the core 56 of a solenoid 57. The energizing circuit of this solenoid 57 is controlled by the float switch 49. When it is deenergized the valve 53 is caused to be in the position shown in Fig. 3. This corresponds to a condition where the oil level extends higher than the float switch 49. Upon recession of the oil level below this float switch, the switch 49 closes, solenoid 57 is energized, and connection to the inlet 47 is made through conduit 51, and conduit 50 is closed.

The mode of operation of this form of the invention is apparent from the foregoing. In this instance the compressor 46 does not operate to increase the gas pressure within the casing 44 unless certain conditions are satisfied; that the motor 45 is energized, and that the inert liquid level is higher than the float switch 49. As soon as the motor 45 is deenergized by opening switch 8, the compressor 46, of course, is also inactive, and the accumulated gas or air within the casing 44 is gradually dissipated, the oil level gradually rising to fill the entire casing 44.

It may be desirable to use some other type of seal for the shaft 4, than that disclosed in Figs. 1 and 2. Thus in Fig. 4 there is shown a seal having no moving surfaces in contact, the sealing effect being secured by a heavy liquid, such as mercury. Collar 13 has a cup 60 secured to it in any convenient way, as by being integral with it, so as to rotate with shaft 4. The cup contains the heavy sealing liquid 61. Casing 5 is provided with a tubular extension 62, surrounding the cup, which has a cover 63 supporting a stationary skirt-like member 64 extending downwardly into the cup. The surface of liquid 61 being above the bottom of this member, the opening into casing 5 is effectively sealed.

What is claimed is:

1. In a submersible electric motor having a casing, and adapted to be submerged in well liquid, a body of neutral liquid adapted to fill the casing, and means submergible with the casing for forming a gaseous atmosphere within the casing for lowering the level of neutral liquid in the casing.

2. In a submersible electric motor having a casing, and adapted to be submerged in well liquid, a body of neutral liquid adapted to fill the casing, and means submergible with the casing for forming a gaseous atmosphere within the casing, and operating during energization of the motor, for lowering the level of neutral liquid in the casing.

3. In a submersible electric motor having a casing, and adapted to be submerged in well liquid, a body of neutral liquid adapted to fill the casing, electrolytic means for generating gas, and means for passing said gas into the casing for lowering the level of neutral liquid in the casing.

4. In a submersible electric motor having a casing, and adapted to be submerged in well liquid, a body of neutral liquid adapted to fill the casing, electrolytic means for generating gas, operating in response to energization of the motor, and means for passing said gas into the casing for lowering the level of neutral liquid in the casing.

5. In a submersible electric motor having a casing, and adapted to be submerged in well liquid, a body of neutral liquid adapted to fill the casing, electrolytic means for generating gas, and means for passing said gas into the casing for lowering the level of neutral liquid in the casing, said electrolytic means including a container having an inlet for well liquid, and means for varying the volume of said container in response to gas pressure conditions in the container.

6. In a submersible electric motor having a casing, and adapted to be submerged in well liquid, a body of neutral liquid adapted to fill the casing, means submergible with the casing for forming a gaseous atmosphere within the casing for lowering the level of neutral liquid in the casing, and a switch for controlling said gaseous atmosphere producing means, operated to active position only when the level of neutral liquid exceeds a definite height.

7. In a submersible electric motor having a casing, a shaft extending upwardly out of the casing, as well as a seal having a pair of relatively rotary members with contacting sealing surfaces that surround the shaft; a body of neutral liquid in the casing, and means for lifting some of the neutral liquid inside of the casing to form a supplemental liquid seal overlapping the contacting surfaces.

8. In a submersible electric motor having a casing, a shaft extending upwardly out of the casing, as well as a seal having a pair of relatively rotary members with contacting sealing surfaces that surround the shaft; a body of neutral liquid in the casing, and means for lifting some of the neutral liquid inside of the casing to form a supplemental liquid seal overlapping the contacting surfaces, said lifting means being operative only during energization of said motor.

9. In a submersible electric motor having a casing, a shaft extending upwardly out of the casing, as well as a seal having a pair of relatively rotary members with contacting sealing surfaces that surround the shaft, said members forming between them an annular space for accommodating liquid, said space having a wall limiting the level of liquid in the space; a body of neutral liquid in the casing, and means for lifting some of the neutral liquid inside of the casing into said annular space to overlap the contacting surfaces.

10. In a submersible electric motor having a casing, a shaft extending upwardly out of the casing, as well as a seal having a pair of relatively rotary members with contacting sealing surfaces that surround the shaft, said members forming between them an annular space for accommodating liquid, said space having a wall limiting the level of liquid in the space; a body of neutral liquid in the casing, means for lifting some of the neutral liquid inside of the casing into said annular space to overlap the contacting surfaces, and means forming a drain from below the space into the lower part of the casing.

11. In a submersible electric motor having a casing, a shaft extending upwardly out of the casing, as well as a seal having a pair of relatively rotary members with contacting sealing surfaces that surround the shaft; a body of neutral liquid in the casing, means for lowering the level of the neutral liquid in the casing, and means for lifting some of the neutral liquid to form a supplemental liquid seal overlapping the contacting surfaces.

12. In a submersible electric motor having a casing, a shaft extending upwardly out of the casing, as well as a seal having a pair of relatively rotary members with contacting sealing surfaces that surround the shaft; a body of neutral liquid in the casing, means for lowering the level of the neutral liquid in the casing and operating in response to energization of the motor, and means for lifting some of the neutral liquid to form a supplemental liquid seal overlapping the contacting surfaces.

13. In a submersible electric motor having a casing adapted to be submerged in well liquid, a neutral liquid in said casing surrounding the motor, a source of supply of neutral liquid above the well, a connection from the source of supply to the casing, means to displace said neutral liquid from about the motor, a check valve in said connection for preventing flow from the casing through the connection, and means operating in response to a rise in level of well liquid within the casing for causing a flow of neutral liquid from the source.

14. In a submersible electric motor having a casing, and adapted to be submerged in well liquid, a body of neutral liquid in the casing, and a compressor operated by the motor for forcing a gas into the casing for depressing the liquid level therein.

15. In a submersible electric motor having a casing, and adapted to be submerged in well liquid, a body of neutral liquid in the casing, a compressor having a gas inlet and connected to the motor, said compressor having an outlet for passing gas under pressure into the casing for depressing the level of the neutral liquid therein, and valve means for opening and closing the inlet.

16. In a submersible electric motor having a casing, and adapted to be sumberged in well liquid, a body of neutral liquid in the casing, a compressor operated by the motor for forcing a gas into the casing for depressing the liquid level therein, and means responsive to the lowering of said level to a desired point for interrupting the supply of gas to the compressor.

17. In a submersible electric motor having a casing, and adapted to be submerged in well liquid, a body of neutral liquid in the casing, a compressor operated by the motor for forcing a gas into the casing for depressing the liquid level therein, and means responsive to the lowering of said level to a desired point for interrupting the supply of gas to the compressor, including a valve in the compresor inlet, adapted optionally to connect the compressor inlet to a source of gas exterior of the casing, or to connect the compressor inlet with the interior of the casing.

18. In a submersible electric motor having a casing, a rotor, and a shaft extending out of the casing, a body of neutral liquid in the casing adapted to surround the rotor, means for lowering the said body of neutral liquid in the casing below the rotor by a gaseous atmosphere and operating in response to energization of the motor, and means forming a fluid packed seal around the shaft.

19. In a submersible electric motor having a casing, a shaft extending out of the casing, and means forming a fluid packed seal around the shaft, a body of neutral liquid in the casing surrounding the motor, a source of supply of said neutral liquid, a connection between said source of supply and the casing, means to displace said neutral liquid from about the motor, means to prevent return flow through said connection from the casing to the source of supply, means to control the flow of liquid from the source to the casing, said control means operating when the level of well liquid within the casing reaches a predetermined level.

20. In a submersible electric motor having a casing, a rotor, a shaft extending out of the casing, and means forming a seal around the shaft, a body of neutral liquid in the casing adapted to surround the rotor, and means operating in response to energization of the motor to cause a gaseous atmosphere to displace said body of liquid from about the rotor.

21. In a submersible electric motor having a casing, a rotor, a shaft extending out of the casing, and means forming a seal around the shaft, a body of neutral liquid in the casing adapted to surround the rotor, means operating in response to energization of the motor to form a gaseous atmosphere in the casing to depress said body of liquid from about the rotor, and means responsive to the lowering of said body of liquid to a desired point for checking the formation of said atmosphere.

22. In a submersible electric motor having a casing, a body of neutral liquid in the casing adapted to surround the motor when the motor is deenergized, electrolytic means for generating gas under pressure to displace the liquid from about the motor, an electric rectifier for operating said electrolytic means, and a circuit for supplying electrical energy to said rectifier, including circuit controlling means responsive to the energization of the motor adapted to close the circuit, and another circuit controlling means in series with said first circuit controlling means, and operating in response to a fall in level of the liquid within the casing to open the circuit.

23. In a submersible electric motor having a casing, a body of neutral liquid in the casing adapted to surround the motor when the motor is deenergized, electrolytic means for generating gas under pressure to displace the liquid from about the motor, and a circuit for supplying electrical energy to said gas generating means, including a series circuit having a pair of circuit controllers in series in said circuit, one controller being operative in response to energization of the motor to close the circuit, and the other controller being responsive to a fall in level of the liquid within the casing to open the circuit.

24. In a submersible electric motor having a casing, as well as a shaft extending out of the casing, a pair of contacting sealing members respectively carried by the shaft and by the casing, a wall forming a well around the contacting surfaces and within the casing, a ball bearing in the casing structure for supporting the shaft, means forming a well around the bearing structure, and means within the casing for passing a lubricant into the well for the seal, the wall serving to permit overflow of the lubricant into the bearing structure well.

FRANK M. MASON.